US009292154B2

(12) United States Patent
Ji et al.

(10) Patent No.: US 9,292,154 B2
(45) Date of Patent: Mar. 22, 2016

(54) SYNCHRONIZING A GUI OPERATION AMONG MACHINES USING DIFFERENT LANGUAGES

(71) Applicant: International Business Machines Corporation, Armonk, NY (US)

(72) Inventors: Xiao Feng Ji, Beijing (CN); Zhong Gang Shen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 14/033,809

(22) Filed: Sep. 23, 2013

(65) Prior Publication Data

US 2014/0096027 A1 Apr. 3, 2014

(30) Foreign Application Priority Data

Sep. 28, 2012 (CN) .......................... 2012 1 0371954

(51) Int. Cl.
*G06F 17/28* (2006.01)
*G06F 3/048* (2013.01)
*G06F 9/44* (2006.01)

(52) U.S. Cl.
CPC .............. *G06F 3/048* (2013.01); *G06F 9/4448* (2013.01)

(58) Field of Classification Search
CPC ... H04L 29/06027; H04L 29/06; H04L 41/22; H04L 67/125; H04L 67/2823; H04L 69/18; G06F 3/0481; G06F 3/0484; G06F 3/048; G06F 8/38
USPC ........... 704/1–3, 7–8; 709/203, 220; 715/239; 358/1.15, 1.13
See application file for complete search history.

(56) References Cited

U.S. PATENT DOCUMENTS

| 2005/0137844 | A1 | 6/2005 | Voruganti |
| 2009/0300658 | A1* | 12/2009 | Morris et al. ................. 719/321 |
| 2010/0162142 | A1* | 6/2010 | Cooper et al. ................ 715/762 |
| 2011/0283261 | A1 | 11/2011 | Yun |
| 2012/0109625 | A1 | 5/2012 | Luo et al. |
| 2012/0159453 | A1 | 6/2012 | Zhao |

FOREIGN PATENT DOCUMENTS

| CA | 2453716 C | 9/2008 |
| EP | 2278469 A2 | 1/2011 |

OTHER PUBLICATIONS

Das, M.S. et al., "Multilingual Optical Character Recognition System for Printed English and Telugu Base Characters," [online] in Int'l. Journal of Science and Advanced Technology, vol. 1, No. 4, Jun. 2011 [retrieved Sep. 23, 2013], retrieved from the Internet: <http://www.ijsat.com/admin/download/[11-01-04-036%20].pdf>, 6 pg.

(Continued)

*Primary Examiner* — Marivelisse Santiago Cordero
*Assistant Examiner* — Stephen M Brinich
(74) *Attorney, Agent, or Firm* — Cuenot, Forsythe & Kim, LLC

(57) ABSTRACT

Synchronizing a Graphical User Interface (GUI) operation includes receiving operation information of the GUI operation performed on a first machine. The operation information includes object information and action information. The object information is in a first language and indicates a GUI object to which the GUI operation is directed. The action information indicates an action performed by the GUI operation on the GUI object. The object information in the first language is converted to object information in a second language. A GUI object in a GUI displayed on a second machine is identified according to the object information in the second language. The action indicated by the action information is performed on the identified GUI object.

20 Claims, 7 Drawing Sheets

(56) References Cited

OTHER PUBLICATIONS

Fu, C. et al., "Inferring types of references to gui objects in test scripts," [online] Proc. of 2nd Int'l Conf. on Software, Testing Verification and Validation (ICST 2009), IEEE Computer Society Press, 2009, pp. 1-10.

"Method for Reusing English GUI Automation Scripts in Multilingual Environment," [online] IP.com, Dislcosure No. 000152916D, May 18, 2007 [retrieved Jan. 25, 2012], retrieved from the Internet: <http://ip.com/IPCOM/000152916>, 1 pg.

* cited by examiner

SYNCHRONIZING A GUI OPERATION AMONG MACHINES USING DIFFERENT LANGUAGES

CROSS-REFERENCE TO RELATED APPLICATIONS

This application claims the benefit of China Application Number 201210371954.4 filed on Sep. 28, 2012, which is fully incorporated herein by reference.

BACKGROUND

In a multilingual test environment, after performing a Graphical User Interface (GUI) operation (e.g., clicking on a button on a GUI, dragging an icon on the GUI, or the like) on the GUI displayed on a machine (e.g., a computer) using a language such as English, a user has to perform a same GUI operation manually on GUIs with the same content but in different languages, which are displayed on machines using other different languages, for example, Chinese, German, etc. For example, when a Translation Verification Test (TVT) is performed, it is necessary for the user to perform a same operation on GUIs of machines using different languages so as to capture TVT bitmaps in different language environments for translation verification. Such repeated manual operations lead to an inefficient test and incur errors easily.

In order to solve the above problem, there is a need for a method and a device which can synchronize a GUI operation in different language environments, i.e., among machines using different languages, such that after the GUI operation is performed by a user on a GUI displayed on a machine using a language such as English, the GUI operation can be synchronized automatically to other machines using non-English languages such as Chinese, German, and so on.

BRIEF SUMMARY

A method includes receiving operation information of a Graphical User Interface (GUI) operation performed on a first machine. The operation information includes object information and action information. The object information is in a first language and indicates a GUI object to which the GUI operation is directed. The action information indicates an action performed by the GUI operation on the GUI object. The method further includes converting the object information in the first language to object information in a second language using a processor, identifying a GUI object in a GUI displayed on a second machine according to the object information in the second language, and performing the action indicated by the action information on the identified GUI object.

A system includes a processor programmed to initiate executable operations. The executable operations include receiving operation information of a GUI operation performed on a first machine. The operation information includes object information and action information. The object information is in a first language and indicates a GUI object to which the GUI operation is directed. The action information indicates an action performed by the GUI operation on the GUI object. The executable operations further include converting the object information in the first language to object information in a second language using a processor, identifying a GUI object in a GUI displayed on a second machine according to the object information in the second language, and performing the action indicated by the action information on the identified GUI object.

A computer program product includes a computer readable storage medium having program code stored thereon. The program code is executable by a processor to perform a method. The method includes receiving operation information of a GUI operation performed on a first machine. The operation information includes object information and action information. The object information is in a first language and indicates a GUI object to which the GUI operation is directed. The action information indicates an action performed by the GUI operation on the GUI object. The method further includes converting the object information in the first language to object information in a second language using a processor, identifying a GUI object in a GUI displayed on a second machine according to the object information in the second language, and performing the action indicated by the action information on the identified GUI object.

BRIEF DESCRIPTION OF THE SEVERAL VIEWS OF THE DRAWINGS

Through the more detailed description of some embodiments of the present disclosure in combination with the accompanying drawings, the above and other objects, features and advantages of the present disclosure will become more apparent, wherein the same reference generally refers to the same components in the embodiments of the present disclosure.

DETAILED DESCRIPTION

Figure 1:
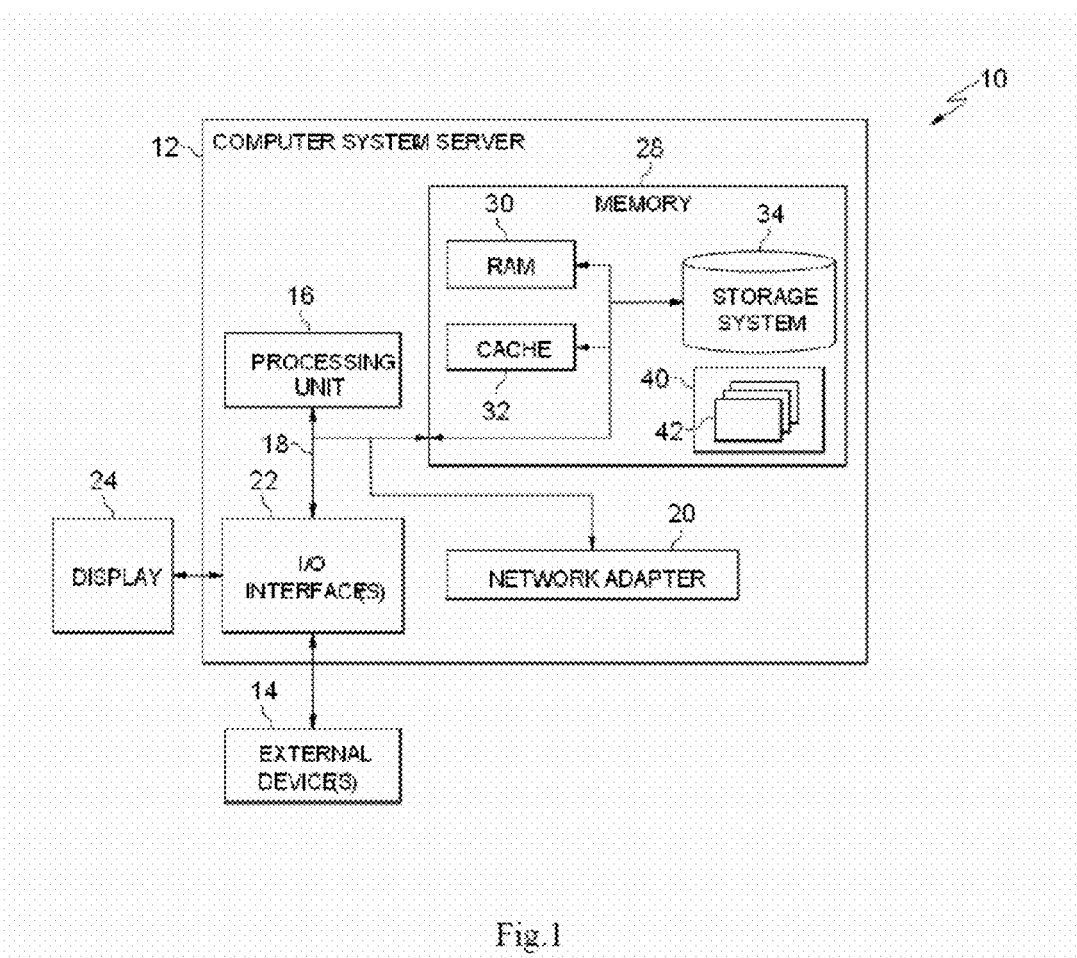
FIG. 1 shows an exemplary computer system/server which is applicable to implement the embodiments of the present invention.

Embodiments of the present invention relate to a multilingual test performed in multiple different language environments, and more specifically, to a method and a device for synchronizing a Graphical User Interface (GUI) operation among machines using different languages.

Embodiments of the present invention are proposed to solve the problems discussed above. An object of one or more embodiments of the present invention is to provide a method and a device for synchronizing a GUI operation among machines using different languages, by which the GUI operation performed on a machine using a language can be automatically synchronized in a machine using another different language.

With the method(s) and device(s) as described within this disclosure, a GUI operation performed on a machine using a language such as English can be automatically synchronized to other machines using different languages, such that it is unnecessary for a user to perform a same GUI operation on machines using different languages repeatedly, improving efficiency of multilingual testing.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, descriptions will be given to a method and a device for synchronizing a GUI operation among machines using different languages according to the embodiments of the present invention.

Figure 2:
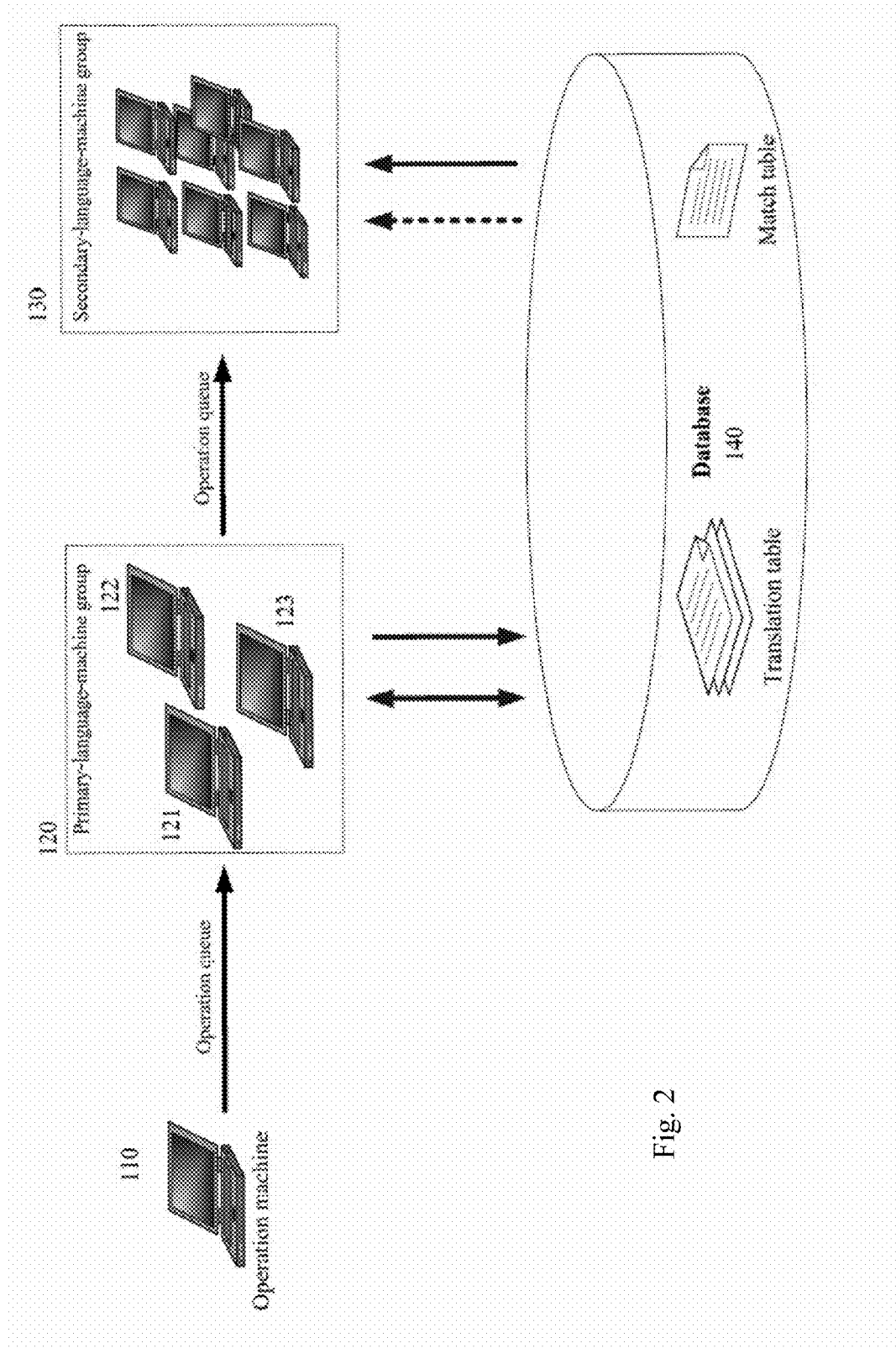
FIG. 2 shows a schematic diagram of a multilingual machine system which may serve as an application environment for the embodiments of the present invention.

With reference to FIG. 2, a schematic diagram of a multi-lingual machine system which can serve as an application environment for the embodiments of the present invention is shown in this figure.

As shown in FIG. 2, this application environment includes an operation machine 110 and a plurality of other machines. The other machines may be divided into two groups, i.e., a primary-language-machine group 120 and a secondary-language-machine group 130, each of which may include one or more machines. As an example of the machine, any machine that can display a GUI and enable a user to perform various operations (referred to as GUI operations hereinafter) on the GUI, such as a computer, a smart phone, a PDA (Personal Digital Assistant), etc., may be used. The operation machine 110 and the respective machines in the primary-language-machine group 120 and the secondary-language-machine group 130 may use languages different from each other, such that GUIs with the same content but in different languages may be displayed. In the embodiments of the present invention, a GUI operation performed by a user on a GUI displayed on the operation machine 110 will be automatically synchronized to the machines in the primary-language-machine group 120 and the secondary-language-machine group 130. It is to be recognized that, although the other machines are divided into two groups in the above, this is merely illustrative, and the other machines may not be grouped, or may be divided into more groups.

The application environment may further include a database 140 which can store a translation table and, in some embodiments, a match table. The translation table and the match table will be described in detail later. The two tables can be selectively used when a GUI operation is synchronized to the respective machines.

The operation machine 110 (a first machine) uses a first language. The first language may be one of various languages such as English, Chinese, German, etc. For the sake of convenience, the embodiments of the present invention will be described by using English as an example of the first language. The user can perform GUI operations on the GUI displayed on the operation machine 110. Particularly, the user can perform various actions on various GUI objects on the GUI, the GUI objects may be, for example, buttons, icons or the like on the GUI, and the actions may be, for example, clicking, dragging or the like. The operation machine 110 may record the various GUI operations performed by the user. For example, the GUI operations may be recorded by existing GUI automation tools, an example of which is Rational Functional tester (RFT) or Silktest tools.

Particularly, a GUI operation may be recorded by recording operation information of the GUI operation. The operation information may include object information and action information, the object information indicating a GUI object to which the GUI operation is directed, the action information indicating an action performed by the GUI operation on the GUI object.

In one implementation, the action information may be recorded as an "operation message", and the object information may include an "Object Type" field and an "Object Tag" field. A GUI object on a GUI may be located uniquely by Object Type and Object Tag of the GUI object. The "Object Type" field indicates a type of the GUI object, such as button, icon, or the like. A value of the "Object Tag" field is content of the GUI object (i.e., GUI object content); in other words, the "Object Tag" field includes the content of the GUI object. The content of the GUI object means a text(s) displayed on the GUI object, such as a text "OK", "Cancel" or the like displayed on a "button" object. Since the operation machine 110 uses English, the recorded object information is English information. When the GUI operation is synchronized to a machine using another language, it is necessary to translate the content of the GUI object included in the "Object Tag" field into a corresponding language, so as to locate the object on a GUI shown on the machine. It is to be appreciated that the object information may be implemented in other manners, besides the implementation manner described above, as long as the object information may identify the GUI object uniquely. For example, in place of the "Object Type" and the "Object Tag", location information indicating a location of a GUI object and content information indicating content of the GUI object may be used; alternatively, the "Object Type" field and the "Object Tag" field may not be set specially, as long as a type of the GUI object and the content of the GUI object are included in the object information.

When a plurality of GUI operations are recorded, each GUI operation may be assigned a unique operation ID in order to identify these GUI operations easily, and the operation ID is associated with the object information and the action information of the GUI object to which the recorded GUI operation is directed. Therefore, each GUI operation may be recorded as information in the format of (operation ID, operation message, object information) or (operation ID, operation message, Object Type, Object Tag) which serves as the operation information of the GUI operation. The operation information of the respective GUI operations may form a GUI operation queue in an execution order. Alternatively, the operation machine 110 may package the operation information of the respective GUI operations into one or more GUI operation packages, and these operation packages may form a GUI operation queue in accordance with the execution order. For example, the operation information of all GUI operations directed at a same GUI object may be packaged into a single GUI operation package, or the operation information of a predetermined number of GUI operations may be packaged into a single GUI operation package.

In order to synchronize the GUI operations to other machines, the operation machine 110 may, actively or in response to requests from the respective machines in the primary-language-machine group 120 and the secondary-language-machine group 130, send the respective operation information in the GUI operation queue to the respective machines in the primary-language-machine group 120 and the secondary-language-machine group 130. The operation machine 110 may send the operation information of the respective GUI operations one by one, or may send the operation information in the unit of a GUI operation package. In addition, the operation machine 110 may send the operation information to the respective machines in the two machine groups in parallel, or may send the operation information to the respective machines in the primary-language-machine group 120 first and then send the operation information to the respective machines in the secondary-language-machine group 130 after completion of synchronization of the GUI operations to the machines in the primary-language-machine group 102. Additionally, the operation machine 110 may send the operation information by using any data transmission technique well known in the art, such as wired transmission, wireless transmission, or the like.

The primary-language-machine group 120 includes at least one machine. The GUI operation performed on the operation machine 110 is synchronized to the respective machines in the primary-language-machine group 12 sequentially. As an example, three machines 121, 122 and 123 are shown in FIG. 2, and the synchronization of the GUI operation is performed on the respective machines in the order of 121, 122 and 123.

In addition, for convenience of explanation, it is assumed that the machine 121 uses Chinese, the machine 122 uses German, and the machine 123 uses Arabic, although these machines may use any other languages.

The secondary-language-machine group 130 also includes at least one machine. As an example, seven machines are shown in FIG. 2.

In a first embodiment of the present invention, the respective machines in the primary-language-machine group 12 and the secondary-language-machine group 130 perform synchronization of a GUI operation in the same way, and the only difference among them lies in the different languages used by the respective machines. Therefore, the method for synchronizing a GUI operation among machines using different languages in accordance with the first embodiment of the present invention will be described by taking the machine 121 as an example.

Figure 3:
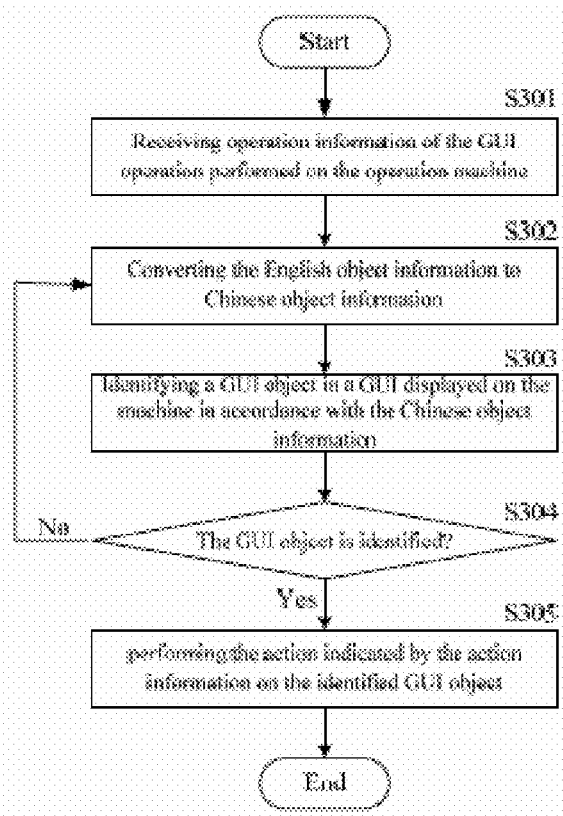
FIG. 3 shows a flowchart of a method for synchronizing a GUI operation among machines using different languages according to a first embodiment of the present invention.

FIG. 3 shows a flowchart of the method for synchronizing a GUI operation among machines using different languages according to the first embodiment of the present invention. The method may be performed by the machine 121, so that the GUI operation performed on the operation machine 110 is synchronized to the machine 121.

As shown in FIG. 3, in step S301, operation information of the GUI operation performed on the operation machine 110 is received. As described above, the operation information includes object information and action information, the object information indicates a GUI object to which the GUI operation is directed, and the action information indicates an action performed by the GUI operation on the GUI object. The object information is English information.

In step S302, the English object information is converted into Chinese object information. As described above, the GUI object to which the GUI operation is directed is located by the object information. Since the received object information is English information, it is necessary to convert the object information into Chinese object information, that is, to convert content of the GUI object included in "Object Tag" of the object information from English to Chinese, in order to locate the GUI object in the Chinese GUI shown in the machine 121 correctly.

Figure 4:
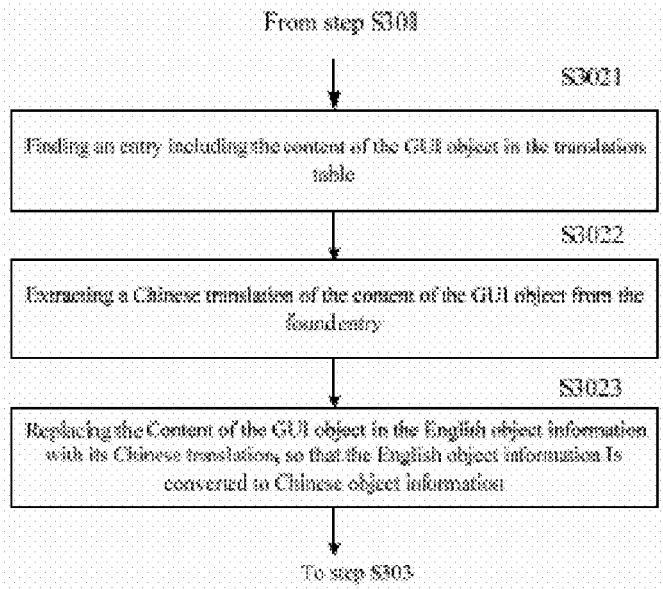
FIG. 4 shows a flowchart illustrating detailed operations of step shown in FIG. 3.

FIG. 4 shows a flowchart illustrating detailed operations of such conversion processing performed in step S302. Specifically, as described above, a translation table, for example a Program Integration Information (PII) table, is stored in the database 140. The translation table is similar to a dictionary, and stores all texts (e.g., characters, words, or sentences) in the English language, which may become the content of the GUI object (i.e., a value of the Object Tag), and their translations in different languages including Chinese in association with each other, as entries of the translation table, and the entries may be assigned unique Translation Table IDs, respectively. The different languages may be languages used in the multilingual test, and in the case where only English and another language are used, the entries of the translation table may include only English texts and their translations in the another language. For example, for an English word "OK", this word and its translations in other languages including Chinese are stored in the translation table as one entry. The following Table 1 shows an example of the translation table.

TABLE 1

| Translation Table ID | English | Chinese | German | ... |
|---|---|---|---|---|
| 1 | OK | 确定 | OKAY | ... |
| 2 | Cancel | 取消 | ABSAGEN | ... |

TABLE 1-continued

| Translation Table ID | English | Chinese | German | ... |
|---|---|---|---|---|
| 3 | File | 提交 | EINREICHEN | ... |
| 4 | File | 文件 | AKTE | ... |
| ... | ... | ... | ... | ... |

It is to be noted that, there may be a case where a word has a plurality of meanings in the used language; that is, a certain word in a certain language may have a plurality of translations in another language. For example, an English word "File" may have at least two translations "提交" and "文件" in Chinese. For the plurality of translations that such a word may have in a same language, respective entries may be established for them in the translation table and assigned corresponding Translation Table IDs. For example, as shown in Table 1, for the Chinese translation "提交" of the English word "File", an entry "3" can be established, and for the Chinese translation "文件" of the English word "File", an entry "4" can be established. In the two entries, the translations of the English word "File" in other languages are the same. It is to be appreciated that the translation table is not limited to the above form, and can adopt other appropriate forms as required.

With reference to FIG. 4, in step S3021, an entry including the content of the GUI object in the received English object information is found in the translation table. Herein, for convenience of explanation, it is assumed that the content of the GUI object is the English word "OK", then an entry including "OK", i.e., the entry "1", is found in the translation table in this step. It is to be noted that, the entry including the content is preferably searched for by traversing the translation table in the order of Translation Table ID, and the search is stopped when a first entry including the content is found. In the above example of "File", the search is stopped when the entry "3" is found, and this entry is used as a search result.

In step S3022, a Chinese translation of the content of the GUI object is extracted from the entry found. In the example of "OK", the Chinese translation "确定" of "OK" is extracted from the entry "1".

In step S3023, the content of the GUI object in the English object information is replaced with its Chinese translation, so that the English object information is converted to Chinese object information. In the example of "OK", the English content "OK" is replaced with its Chinese translation "确定", so that the English object information is converted to the Chinese object information.

Returning to FIG. 3, after completion of the language conversion (translation) of the object information, a GUI object is identified in a GUI displayed on the machine 121 in accordance with the Chinese object information in step S303. As described above, the GUI object may be defined uniquely by the "Object Type" and the "Object Tag", so the identification can be performed by searching the GUI displayed on the machine 121 for a GUI object having the same Object Type and the same value of the Object Tag (i.e., the same content of GUI object). Since the operation machine 110 and the machine 121 display GUIs having the same contents but in different languages, the identified GUI object is just the GUI object to which the GUI operation performed on the operation machine 110 is directed.

Next, in step S304, it is determined whether the GUI object is identified in the GUI displayed on the machine 121. If yes, the process proceeds to step S305, in which the action indicated by the action information in the object information is performed on the identified GUI object. For example, the action information and the identified GUI object may be associated with each other by using a Hook mechanism, such that the corresponding action is performed on the identified GUI object. Therefore, the GUI operation performed on the operation machine 110 can be automatically synchronized to the machine 121.

On the other hand, if it is determined in Step S304 that no GUI object is identified, this means that the translation extracted in step S3022 is incorrect, which corresponds to for example the case where one word has a plurality of meanings. Therefore, it is necessary to extract the translation of the content of the GUI object newly. To this end, the process returns to step S302, and steps S302-S304 are performed again. Specifically, when steps S302-S304 are performed again, in step S302, a next entry including the content of the GUI object in the English object information, i.e., an entry other than the entry found previously, is found in the translation table, a Chinese translation of the content of the GUI object is extracted from the next entry, and then the English content in the English object information is replaced with the Chinese translation so that the English object information is converted to Chinese object information again. Then, in step S303, a GUI object is identified in the GUI displayed on the machine 121 according to the Chinese object information obtain by the conversion, and in step S304, it is determined whether the GUI object is identified. The above operations are repeated until it is determined that the GUI object is identified.

The above processing is repeated for all GUI operations performed by the user on the operation machine 110, thereby these operations may be synchronized to the machine 121.

The other machines 122 and 123 in the primary-language-machine group 120 and the respective machines in the secondary-language-machine group 130 can all perform the method described above with reference to FIG. 3 and FIG. 4, such that the GUI operations performed on the operation machine 110 are automatically synchronized to these machines. These machines can perform the synchronization of the GUI operations sequentially or in parallel.

In the first embodiment, the respective machines in the primary-language-machine group 120 and the secondary-language-machine group 130 perform the synchronization of the GUI operation in the same way, which means that, during the synchronization of the GUI operation, each machine would access the translation table at least one time to search for the entry including the content of the GUI object therein. Since entries have been established for all English texts which may become the content of the GUI object, and thus the translation table has a large number of entries, it may take a long time to find a desired entry in the translation table. In an extreme case, the whole translation table has to be traversed to find the desired entry. This renders that when there are a large number of GUI operations or languages, much time has to be spent to complete the synchronization of the GUI operations on all the machines. In the case where one word has a plurality of meanings, this problem becomes worse because the translation table has to be accessed many times.

In order to solve this problem, a method for synchronizing a GUI operation among machines using different languages in accordance with a second embodiment of the present inventive is proposed. In this method, during the process that the machine 121, which is a first machine of the primary-language-machine group 120, performs synchronization of the GUI operation in the way described above, the machine 121 further establishes a match table, such that the other machines in the primary-language-machine group 120 and the respective machines in the secondary-language-machine group 130 may perform the synchronization of the GUI operation with reference to the match table, so as to reduce the time required by the synchronization.

Specifically, as described above, when the synchronization of the GUI operation is performed in the machine 121, the entry including the content (in English) of the GUI object is found in the translation table, the content of the GUI object is replaced with its Chinese translation in this entry so that the English object information is converted to the Chinese object information, and then a GUI object in the GUI displayed on the machine 121 is identified by using the Chinese object information. In the second embodiment, when the GUI object is successfully identified by using the Chinese object information, an Operation ID of the GUI operation and a Translation Table ID of the corresponding entry found in the translation table for the GUI operation (referred to as entry matching the GUI operation hereinafter) are further recorded in the match table in association with each other. The recording operation is performed for each GUI operation. Therefore, after completion of synchronization of all GUI operations, for example, the match file shown in Table 2 below may be formed.

TABLE 2

| Operation ID | Translation Table ID |
|---|---|
| 1 | 1 |
| 2 | 3 |
| ... | ... |

As such, after the machine 121 completes the synchronization of all GUI operations, the Operation ID of each of the GUI operations and the Translation Table ID of the translation table entry matching the GUI operation have been stored in the match table. It is to be appreciated that the match table is not limited to the above form, and can adopt any appropriate form as required, as long as it can associate the GUI operation and the translation table entry matching this GUI operation. For example, in the match table, instead of storing the Operation ID of the GUI operation, the object information of the GUI operation may be stored together with the Translation Table ID of the translation table entry matching the GUI operation.

The method for synchronizing a GUI operation in machines using different languages in accordance with the second embodiment will be described below. The method can be performed by machines in the primary-language-machine group 120, which perform the synchronization of the GUI operation after the first machine 121. In the example shown in FIG. 2, the method can be performed by the machines 122 and 123 sequentially. Herein, it is assumed that the method is performed by the machine 122 which uses German.

Figure 5:
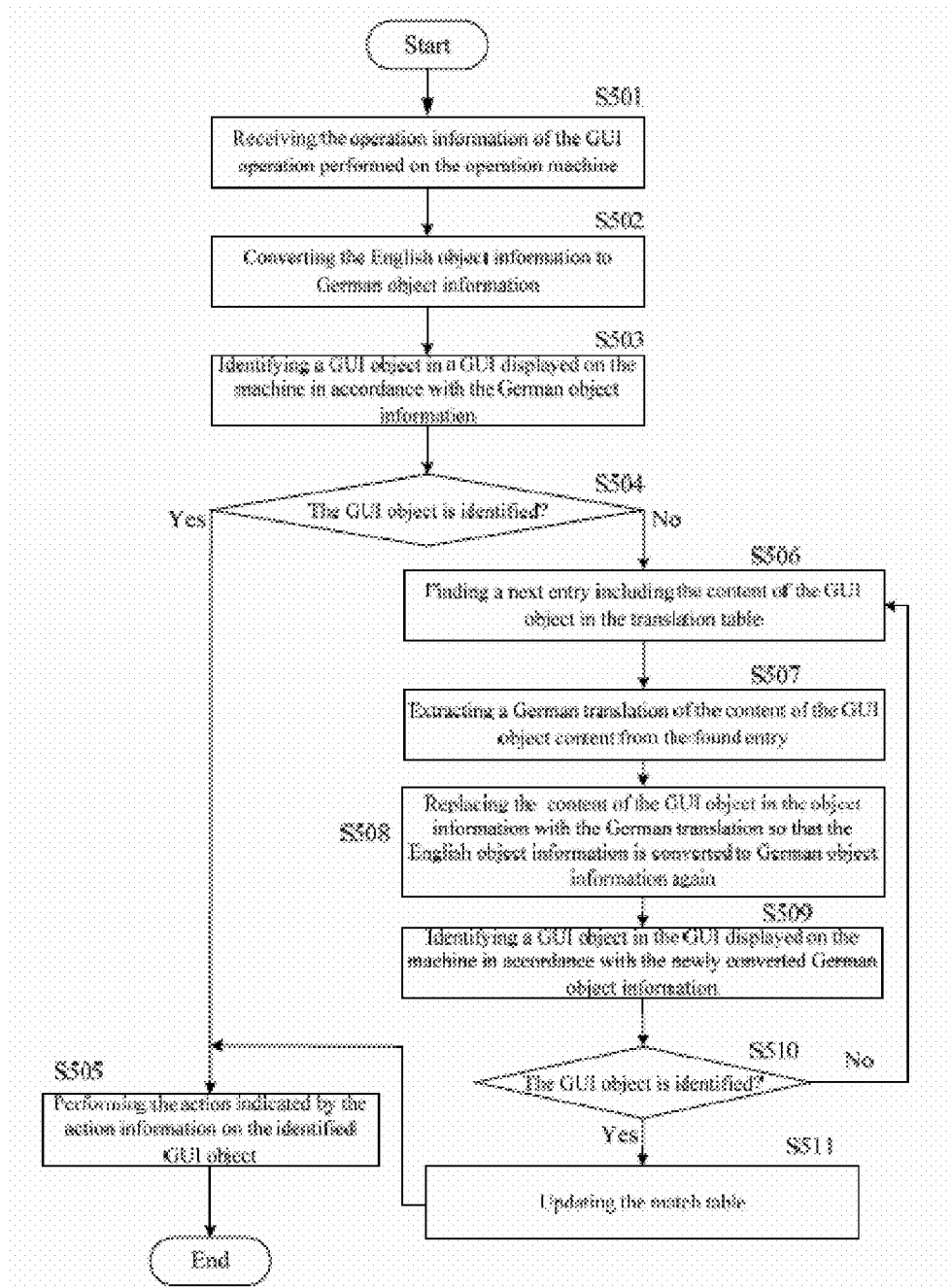
FIG. 5 shows a flowchart of a method for synchronizing a GUI operation among machines using different languages according to a second embodiment of the present invention.
Figure 6:
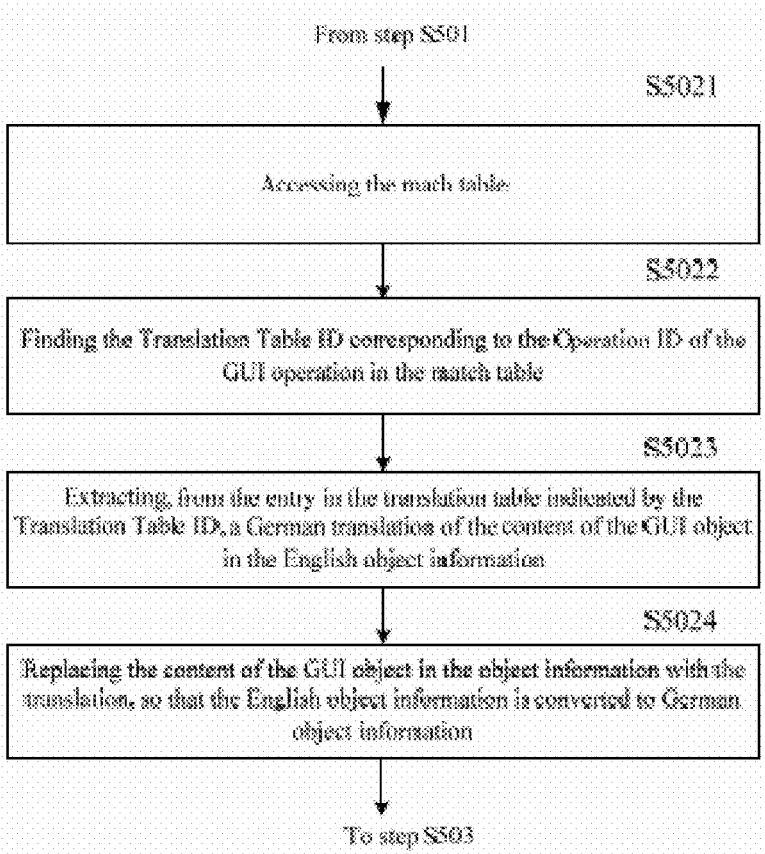
FIG. 6 shows a flowchart illustrating detailed operations of step shown in FIG. 5.

As shown in FIG. 5, in step S501, the operation information of the GUI operation performed on the operation machine 110 is received. The step is the same as step S301, thus a detailed description thereof is omitted.

In step S502, the English object information is converted to German object information. Similarly to the above step S302, the content of the GUI object included in the English object information (e.g., in the "Object Tag") may be converted from English to German so as to implement the conversion.

FIG. 5 shows a flowchart illustrating detailed operations of this conversion processing performed in step S502.

Specifically, in step S5021, the match table is accessed. As described above, at least the Operation ID of the GUI operation and the Translation Table ID of the translation table entry, which was found for the GUI operation by another machine (for example, the machine 121) that has synchronized the GUI operation, have been stored in the match table. In step S5022, the Translation Table ID corresponding to the operation ID of the GUI operation is found in the match table. Then, in step S5023, a German translation of the content of the GUI object included in the English object information (specifically, in an "Object Tag" field thereof) is extracted from the translation table entry indicated by the Translation Table ID, and in step S5024, the English content of the GUI object included in the English object information is replaced with the German translation thereof, so that the English object information is converted to the German object information.

Returning to FIG. 5, in step S503, a GUI object is identified in a GUI displayed on the machine 122 in accordance with the German object information. This step is similar to step S303 shown in FIG. 3, thus a detailed description thereof is omitted.

Next, in step S504, it is determined whether the GUI object is identified in step S503. If the GUI object is identified, the process proceeds to step S505, where the action indicated by the action information is performed on the identified GUI object, thus the GUI operation performed on the operation machine 110 is synchronized to the machine 122.

On the other hand, if it is determined in Step S504 that no GUI object is identified, this means that the translation in the entry found according to the record in the match table is incorrect, which corresponds to for example the case where one word has a plurality of meanings, and it is necessary to find an entry having a correct translation newly. Therefore, in step S506, the translation table is accessed, so as to find in the translation table a next entry including the English content of the GUI object, other than the entry having the Translation Table ID found in step S5022.

Next, in step S507, a German translation of the content of the GUI object is extracted from the next entry, and then in step S508, the English content of the GUI object in the English object information is replaced with the German translation so that the English object information is converted to German object information again.

Then, in step S509, a GUI object is identified in the GUI displayed on the machine 122 according to the newly converted German object information, and in step S510, it is determined whether the GUI object is identified.

If the GUI object is identified, in step S511, the Translation Table ID stored in association with the Operation ID in the match table is replaced with the Translation Table ID of the next entry, so as to update the match table, and then step S505 is performed as above. On the other hand, if no GUI object is identified, the process returns to step S506, and steps S506-S510 are performed repeatedly until the GUI object is identified. Likewise, when step S506 is performed repeatedly, the entry/entries found previously should be excluded.

Thus, all GUI operations performed on the operation machine 110 may be synchronized to the machine 122 by repeating the above processing for all of the GUI operations.

In the second embodiment, the machine (e.g., machine 121) which is the first machine to perform the synchronization of the GUI operation in the primary-language-machine group establishes the match table, and the Operation ID of each GUI operation and the Translation Table ID of the translation table entry matching the GUI operation are stored in the match table. This builds a direct association between each GUI operation and the entry of the translation table, such that subsequent machines (for example, the machine 122) can obtain the entry of the translation table which matches the GUI operation directly from the match table when it performs the synchronization of the GUI operation, and thus obtain the desired translation quickly. A search for a related entry in the translation table is performed only when the translation obtained according to the match table is incorrect. Therefore, compared with the first embodiment, the second embodiment significantly reduces a workload for searching for the entry, accelerates the synchronization of the GUI operation, and improves an efficiency of the synchronization of the GUI operation.

After the machine 122 completes the synchronization of the GUI operation, the machine 123 in the primary-language-machine group 120 can use the match table updated by the machine 122 to perform the method described above with reference to FIG. 3 and FIG. 4, so as to synchronize the GUI operation performed on the operation machine 110 to the machine 123. Although the translations obtained in accordance with the records in the match table may be incorrect due to existence of the phenomenon that one word has multiple meanings, the above synchronization operation performed by the machine 122 has corrected and updated the match table, which makes the entries in the translation table more accurate. Thereby, when a subsequent machine performs the synchronization of the GUI operation by using the updated match table, the ratio of obtaining correct translations in accordance with the match table is further improved. Likewise, the respective machines in the secondary-language-machine group 130 may also perform the synchronization of the GUI operation sequentially, in which each machine performs the method described with reference to FIG. 3 and FIG. 4 by using the match table updated by a previous machine.

According to experience of the inventors, the ratio of obtaining correct translations in accordance with the match table will achieve or exceed 90% after the match table has been corrected/updated in three language environments. This means that the records in the match table are quite correct, and subsequent machines, when performing the synchronization of the GUI operation, can obtain correct translations according to the match table only, without the need of accessing the translation table and/or updating the match table. Therefore, in the second embodiment, it is preferable to group the machines, such that the number of the machines in the primary-language-machine group 120 is less than 4 and is preferably 3, with the respective machines using different languages. In consideration of different frequencies of occurrence of the phenomenon that one word has multiple meanings in different languages, it is more preferable that the three machines in the primary-language-machine group 120 use Chinese, one of west European languages, and Arabic, respectively. Each machine in the primary-language-machine group 120 performs the method described with reference to FIG. 3 and FIG. 4 by using the match table updated by a previous machine, after the previous machine completes the synchronization of the GUI operation; and the respective machines in the secondary-language-machine group 130 can perform the steps, except for steps S506-S511, in the method described in FIG. 3 and FIG. 4 sequentially or in parallel without updating the match table, which further accelerates the synchronization of the GUI operation on all of the machines.

Hereinafter, a device for synchronizing a GUI operation among machines using different languages in accordance with the first embodiment of the present invention will be described with reference to FIG. 7. The device can be included in the respective machines in the primary-language-machine group 120 and the secondary-language-machine group 130, or can be operatively coupled to the respective machines, so as to synchronize the GUI operation performed on the operation machine 110 to the respective machines.

Hereinafter, a description will be given by means of an example that the device is included in the machine 121.

Figure 7:
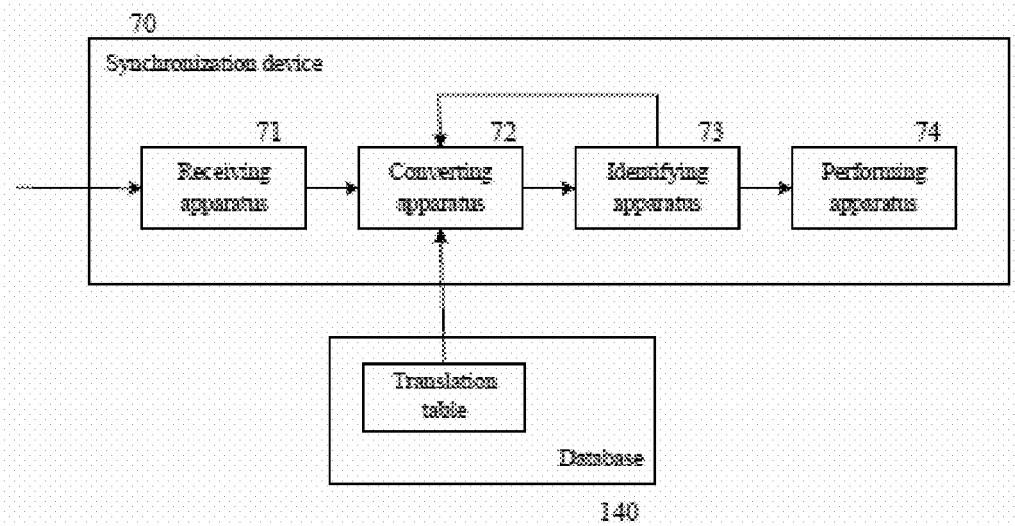
FIG. 7 shows a block diagram of a device for synchronizing a GUI operation among machines using different languages according to a first embodiment of the present invention.

As shown in FIG. 7, the synchronization device 70 includes a receiving apparatus 71, a converting apparatus 72, an identifying apparatus 73 and a performing apparatus 74. These apparatuses can perform the respective steps in the method described with reference to FIG. 3 and FIG. 4 in the way described above, respectively, thus brief descriptions thereof will be given hereinafter, and descriptions of the same parts will be omitted.

The receiving apparatus 71 receives, from the operation machine 110, operation information of the GUI operation performed on the operation machine 110. The operation information includes object information and action information, the object information indicates a GUI object to which the GUI operation is directed, and the action information indicates an action performed by the GUI operation on the GUI object. Since the operation machine 110 uses English, the received object information is English information.

The converting apparatus 72 converts the English object information to Chinese object information. This conversion is performed in order to enable a GUI object to be located on a GUI displayed in Chinese. Specifically, this conversion is implemented by converting a value in the English object information (in the case where an "Object Tag" field is used, in the "Object Tag" field), i.e., English content of the GUI object, to a Chinese translation thereof.

Figure 8:
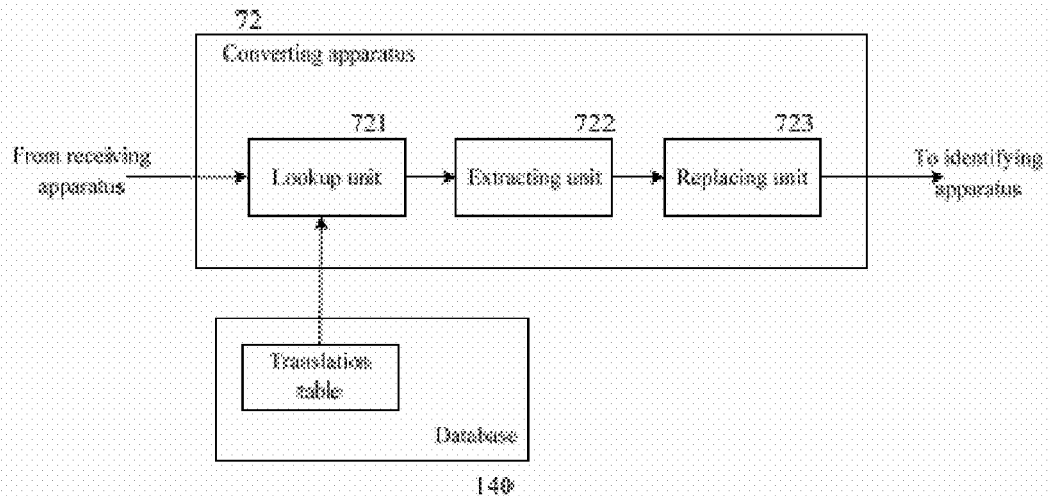
FIG. 8 shows a block diagram illustrating a specific structure of a converting apparatus shown in FIG. 7.

FIG. 8 shows a specific structure of the converting apparatus 72. As shown in FIG. 8, the converting apparatus 72 may include a lookup unit 721, an extracting unit 722 and a replacing unit 723.

The lookup unit 721 receives the operation information of the GUI operation sent from the receiving apparatus, and finds in a translation table an entry including the content of the GUI object in the object information included in the operation information. The translation table herein is the same as that described above, and a detailed description thereof is omitted.

The extracting unit 722 extracts, from the entry found by the lookup unit 721, a Chinese translation of the content (in English) of the GUI object to which the GUI operation is directed.

The replacing unit 723 replaces the content of the GUI object in the English object information with the Chinese translation, so that the English object information is converted to the Chinese object information.

Returning to FIG. 7, the converting apparatus 72 outputs the converted Chinese object information to the identifying apparatus 73. The identifying apparatus 73 identifies a GUI object in a GUI displayed on the machine 121 according to the Chinese object information. Particularly, the identifying apparatus 72 may perform the identification by searching the GUI displayed on the machine 121 for a GUI object having an Object Type and GUI object content (a value of an Object Tag) included in the Chinese object information.

In addition, the identifying apparatus 73 further determines whether the GUI object is successfully identified. If no GUI object is identified, this means that the translation found previously by the converting apparatus 72 in the translation table is incorrect. Therefore, the identifying apparatus 73 instructs the converting apparatus 72 to perform again the processing of converting the English object information to Chinese object information. In response to this instruction, the lookup unit 721 in the converting apparatus 72 accesses the translation table, and finds, in the translation table, a next entry including the content of the GUI object in the English object information other than the entry found previously; the extracting unit 722 extracts a Chinese translation of the content of the GUI object from the next entry; and then the replacing unit 723 replaces the content of the GUI object in the English object information with the Chinese translation, and outputs the Chinese object information thus obtained to the identifying apparatus 73. The identifying apparatus 73 identifies a GUI object in the GUI displayed on the machine 121 according to the newly converted Chinese object information, and determines again whether the GUI object is successfully identified. The converting apparatus 72 and the identifying apparatus 73 repeat the above operations, until the GUI object is identified.

On the other hand, if the GUI object is successfully identified, this means that the translation found by the converting apparatus 72 in the translation table is correct. Therefore, the identifying apparatus 73 can signal the performing apparatus 74 such that the performing apparatus 74 performs the action, which is indicated by the action information in the object information, on the identified GUI object. Thus, with the device in accordance with the first embodiment of the present invention, the GUI operation performed on the operation machine 110 is automatically synchronized to the machine 121.

In the same way, with the above device, the GUI operation performed on the operation machine 110 may be automatically synchronized to the other machines in the primary-language-machine group 120 and the respective machines of the secondary-language-machine group 130.

Likewise, in order to avoid the translation table from being accessed for one or more times each time when the synchronization of the GUI operation is performed, a device for synchronizing a GUI operation in accordance with the second embodiment of the present invention is proposed. When the device performs the synchronization of the GUI operation, it uses the above described match table, and accesses the translation table only when necessary.

Figure 9:
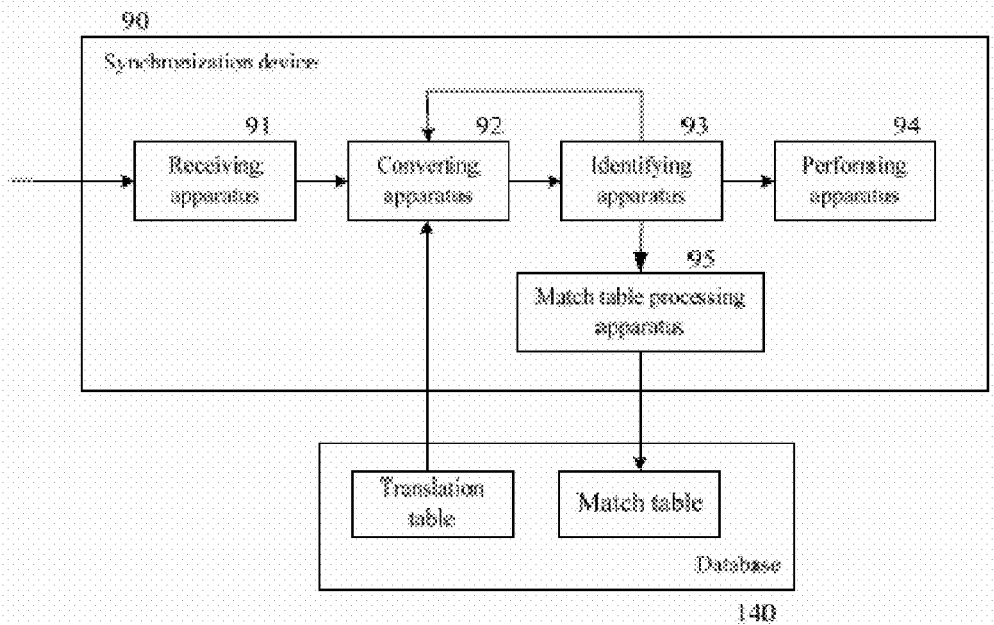
FIG. 9 shows a block diagram of a device for synchronizing a GUI operation among machines using different languages according to a second embodiment of the present invention.

FIG. 9 shows a device for synchronizing a GUI operation among machines using different languages in accordance with the second embodiment of the present invention. The device may be included in a machine (e.g., the machine 121) which is a first machine to perform the synchronization of the GUI operation in the primary-language-machine group 120, or may be operatively coupled to the machine.

As shown in FIG. 9, the device 90 includes a receiving apparatus 91, a converting apparatus 92, an identifying apparatus 93, a performing apparatus 94 and a match table processing apparatus 95, where the receiving apparatus 91, the converting apparatus 92, the identifying apparatus 93 and the performing apparatus 94 are the same as the receiving apparatus 71, the converting apparatus 72, the identifying apparatus 73 and the performing apparatus 74 shown in FIG. 7, respectively, and perform the synchronization of the GUI operation in the way described with reference to FIG. 7, therefore, descriptions thereof are omitted.

The match table processing apparatus 95 establishes a match table. The match table is the same as that described above. Particularly, when a GUI object is identified by using the Chinese object information, the match table processing apparatus 95 records the Operation ID of the GUI operation and the Translation Table ID of the corresponding entry found in the translation table for the GUI operation (i.e., the entry matching the GUI operation) in the match table in association with each other. The match table processing apparatus 95 performs the above operation for each GUI operation, such that the match table shown in the above Table 2 may be formed for use by subsequent machines in the synchronization of the GUI operation.

Figure 10:
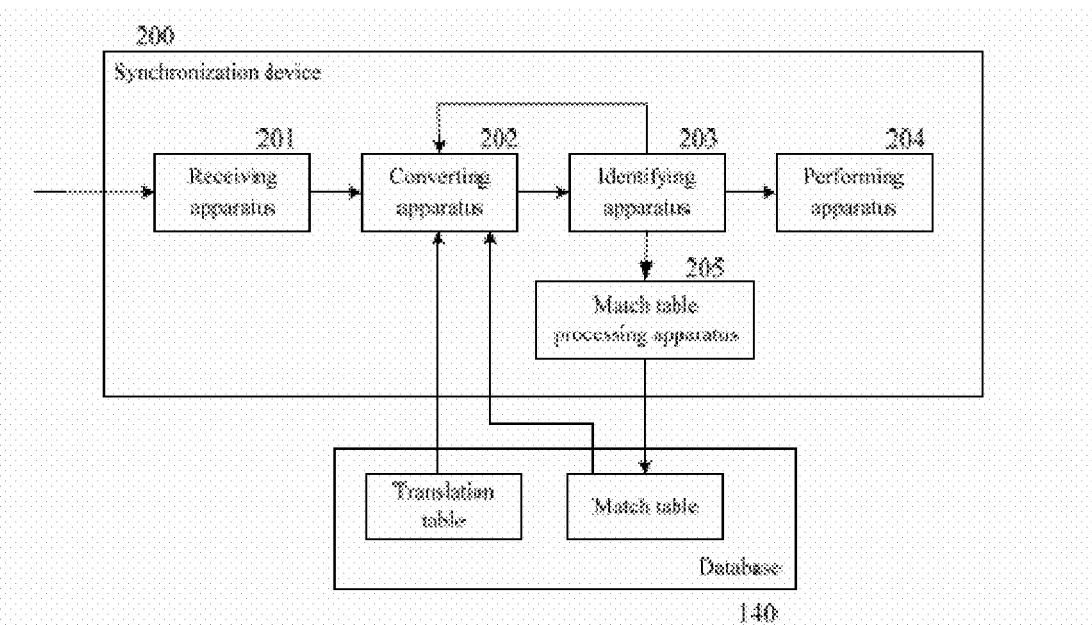
FIG. 10 shows a block diagram of another device for synchronizing a GUI operation among machines using different languages according to the second embodiment of the present invention.

FIG. 10 shows another device for synchronizing a GUI operation among machines using different languages in accordance with the second embodiment of the present invention. The device can be included in other machines (for example, the machines 122 and 123) than the machine which is the first machine to perform the synchronization of the GUI operation in the primary-language-machine group 120, or can be operatively coupled to the other machines. Hereinafter, a description will be given by means of an example that the device is included in the machine 121, and it is assumed that the machine 122 uses German.

As shown in FIG. 10, the device 200 includes a receiving apparatus 201, a a converting apparatus 202, an identifying apparatus 203, a performing apparatus 204 and a match table processing apparatus 205.

The receiving apparatus 201 receives the operation information of the GUI operation performed on the operation machine 110.

The converting apparatus 202 converts the English object information included in the operation information into German object information. Unlike the device 70 in accordance with the first embodiment, when performing the conversion, the converting apparatus 202 obtains a translation of the content of the GUI object to which the GUI operation is directed by using the match table, and searches the translation table for a translation corresponding to the content of the GUI object only when the translation found by using the match table is incorrect.

Figure 11:
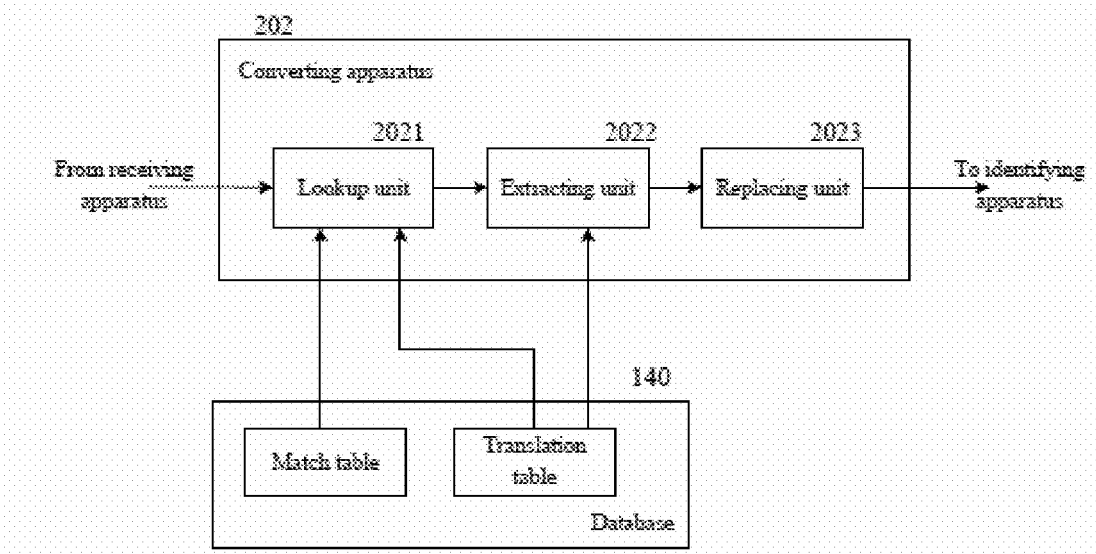
FIG. 11 shows a block diagram illustrating a specific structure of a converting apparatus shown in FIG. 10.

FIG. 11 shows a block diagram of a structure of the converting apparatus 202. As shown in FIG. 11, the converting apparatus 202 includes a lookup unit 2021, an extracting unit 2022 and a replacing unit 2023. When receiving the operation information of the GUI operation from the receiving apparatus 201, the lookup unit 2021 accesses the match table, and finds in the match table the Translation Table ID corresponding to the operation ID of the GUI operation. The extracting unit 2022 accesses the translation table, and extracts, from an entry of the translation table indicated by the Translation Table ID, a German translation of the English content of the GUI object included in the objection information. Then, the replacing unit 2023 replaces the English content included in the English object information with the German translation, so as to convert the English object information to the German object information.

Returning to FIG. 10, the identifying apparatus 203 identifies a GUI object in a GUI displayed on the machine 122 according to the German object information output from the converting apparatus 202. Then, the identifying apparatus 203 determines whether the GUI object is identified.

If the GUI object is identified, the performing apparatus 204 performs the action indicated by the action information on the identified GUI object. Thereby, the GUI operation performed on the operation machine 110 is synchronized to the machine 122 quickly by using the match table.

On the contrary, if no GUI object is identified, this means that the translation found in accordance with the match table is incorrect due to various reasons such as the phenomenon that one word has multiple meanings. At this time, the identifying apparatus 203 instructs the converting apparatus 202 to newly convert the object information. In response to this instruction, the lookup unit 2021 in the converting apparatus 202 accesses the translation table so as to find in the translation table a next entry including the English content of the GUI object, other than the entry found in accordance with the match table. Then, the extracting unit 2022 extracts a German translation of the content of the GUI object from the next entry, and the replacing unit 2023 replaces the English content of the GUI object in the object information with the German translation, so as to convert the English object information to the German object information again. The identifying apparatus 73 identifies a GUI object in the GUI displayed on the machine 122 by using the newly converted German object information, and determines whether the GUI object is successfully identified. If no GUI object is identified yet, the identifying apparatus 203 instructs the converting apparatus to perform the above process of searching the translation table for a translation again, until the GUI object is identified.

On the other hand, if the GUI object is successfully identified, the performing apparatus 204 performs the action indicated by the action information on the object, such that the GUI operation is synchronized to the machine 122. In addition, the identifying apparatus 203 further instructs the match table processing apparatus 205 to replace the Translation Table ID stored in association with the Operation ID in the match table with the Translation Table ID of the entry matching the GUI operation found in the translation table, so as to update the match table.

Thus, with the device 200, the GUI operation performed on the operation machine 110 can be synchronized to the machine 122, and the match table can be updated when necessary, such that the correct ratio of its entries is improved.

The above device in accordance with the second embodiment of the present invention can find a correct translation of the content of the GUI object quickly by using the match table established or updated by the machine/device which performs the synchronization of the GUI operation previously, which accelerates the synchronization of the GUI operation and improves the efficiency of the synchronization of the GUI operation.

The other machines in the primary-language-machine group 120 and the respective machines in the secondary-language-machine group 130 may include devices which are the same as the device 200, respectively, and the GUI operation is synchronized to the respective machines by using these devices. Preferably, these devices perform the synchronization of the GUI operation sequentially, such that when performing the synchronization of the GUI operation, each machine can use the match table updated by previous machines.

As described above, when the primary-language-machine group includes no more than four machines (preferably, three machines), and after these machines complete the synchronization of the GUI operation and/or the update of the match table by using the above devices, the records in the match table are accurate enough, therefore, the respective machines in the secondary-language-machine group 130 may perform the synchronization of the GUI operation by using only the match table without updating the match table, which further shorten the time required for synchronizing the GUI operation to all machines.

It can be seen that, with the above described methods and devices in accordance with the embodiments of the present invention, the GUI operation performed on the operation machine can be automatically synchronized to other machines using different languages, which eliminates the need for a user to perform the same GUI operation repeatedly on the machines using different languages, thus reduces a workload of the multilingual test, reduces a probability of making mistakes, and improves a work efficiency.

It is to be noted that the above embodiments are merely illustrative, not limitative. Although it is assumed above that the machine 121 uses Chinese, the machine 122 uses German, and the machine 123 uses Arabic, this is only for the convenience of explanation. Actually, these machines can use any other languages. In addition, the respective component parts of the above devices can be further be divided into more sub-modules, as long as these sub-modules can cooperate with each other to accomplish the above functions. Or, the respective component parts of the above devices can be combined into a bigger module, such as a PII match engine, which may operate in the way described above and synchronize the GUI operation performed on the operation machine 110 to other machines.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving operation information of a Graphical User Interface (GUI) operation performed on a first machine, the operation information including object information and action information, the object information being in a first language and indicating a GUI object to which the GUI operation is directed, and the action information indicating an action performed by the GUI operation on the GUI object;
    converting the object information in the first language to object information in a second language using a processor;
    identifying a GUI object in a GUI displayed on a second machine according to the object information in the second language; and
    performing the action indicated by the action information on the identified GUI object.

2. The method of claim 1, wherein the object information includes a GUI object type and GUI object content.

3. The method of claim 2, wherein converting the object information in the first language to object information in the second language comprises:
    converting the GUI object content in the object information in the first language to a translation in the second language of the content.

4. The method of claim 2, wherein converting the object information in the first language to object information in the second language comprises:
    finding, in a translation table, an entry including the GUI object content in the object information in the first language, the translation table storing all texts that can become the GUI object content in the first language and their translations in the second language in association with each other as entries;
    extracting, from the found entry, a translation in the second language of the GUI object content; and
    replacing the GUI object content in the object information in the first language with the translation, so that the object information in the first language is converted to the object information in the second language.

5. The method of claim 4, further comprising:
    if no GUI object is identified according to the object information in the second language, finding, in the translation table, a next entry including the GUI object content;
    extracting, from the next entry, a translation in the second language of the GUI object content;
    replacing the GUI object content in the object information in the first language with the translation, so that the object information in the first language is converted to the object information in the second language again; and
    identifying a GUI object in the GUI displayed on the second machine according to the newly converted object information in the second language.

6. The method of claim 4, wherein the GUI operation has a unique Operation ID, and each entry in the translation table has a unique Translation Table ID; and
    wherein the method further comprises:
    if the GUI object is identified according to the object information in the second language, the Operation ID of the GUI operation and the Translation Table ID of the entry found in the translation table are recorded in association with each other in a match table.

7. The method of claim 2, wherein the GUI operation has a unique Operation ID, and wherein converting the object information in the first language to object information in the second language includes:
    accessing the match table in which at least the Operation ID of the GUI operation and a Translation Table ID of an entry of the translation table, which was found for the GUI operation by a third machine that has synchronized the GUI operation, have been stored, wherein the translation table stores all texts that can become the GUI object content in the first language and their translations in the second language in association with each other as entries, and each of the entries has a unique Translation Table ID;
    finding, in the match table, the Translation Table ID corresponding to the Operation ID of the GUI operation;
    extracting, from the entry of the translation table indicated by the Translation Table ID, a translation in the second language of the GUI object content; and
    replacing the GUI object content in the object information in the first language with the translation, so that the object information in the first language is converted to the object information in the second language.

8. The method of claim 7, further comprising:
    if no GUI object is identified according to the object information in the second language, finding, in the translation table, a next entry including the GUI object content, other than the entry of the translation table indicated by the Translation Table ID, and extracting, from the next entry, a translation in the second language of the GUI object content;
    replacing the GUI object content in the object information in the first language with the translation, so that the object information in the first language is converted to the object information in the second language again; and
    identifying a GUI object in the GUI displayed on the second machine according to the newly converted object information in the second language.

9. The method of claim 8, wherein if a corresponding GUI object is identified according to the newly converted object information in the second language, the Translation Table ID stored in association with the Operation ID in the match table is replaced with a Translation Table ID of the next entry, so as to update the match table.

10. A system, comprising:
    a processor programmed to initiate executable operations stored in a memory device, said operations comprising:
        receiving operation information of a Graphical User Interface (GUI) operation performed on a first machine, the operation information including object information and action information, the object information being in a first language and indicating a GUI object to which the GUI operation is directed, and the action information indicating an action performed by the GUI operation on the GUI object;
        converting the object information in the first language to object information in a second language;
        identifying a GUI object in a GUI displayed on a second machine according to the object information in the second language; and
        performing the action indicated by the action information on the identified GUI object.

11. The system of claim 10, wherein the object information includes a GUI object type and GUI object content.

12. The system claim 11, wherein converting the object information in the first language to object information in the second language comprises:
    converting the GUI object content in the object information in the first language to a translation in the second language of the content.

13. The system of claim 11, wherein converting the object information in the first language to object information in the second language comprises:
    finding, in a translation table, an entry including the GUI object content in the object information in the first language, the translation table storing all texts that can become the GUI object content in the first language and their translations in the second language in association with each other as entries;
    extracting, from the found entry, a translation in the second language of the GUI object content; and
    replacing the GUI object content in the object information in the first language with the translation, so that the object information in the first language is converted to the object information in the second language.

14. The system of claim 13, wherein the processor further is programmed to initiate executable operations comprising:
    if no GUI object is identified according to the object information in the second language, finding, in the translation table, a next entry including the GUI object content;
    extracting, from the next entry, a translation in the second language of the GUI object content;
    replacing the GUI object content in the object information in the first language with the translation, so that the object information in the first language is converted to the object information in the second language again; and identifying a GUI object in the GUI displayed on the second machine according to the newly converted object information in the second language.

15. The system of claim 13, wherein the GUI operation has a unique Operation ID, and each entry in the translation table has a unique Translation Table ID, wherein the processor further is programmed to initiate executable operations comprising:

if the GUI object is identified according to the object information in the second language, the Operation ID of the GUI operation and the Translation Table ID of the entry found in the translation table are recorded in association with each other in a match table.

16. The system of claim 11, wherein the GUI operation has a unique Operation ID, and wherein converting the object information in the first language to object information in the second language includes:

accessing the match table in which at least the Operation ID of the GUI operation and a Translation Table ID of an entry of the translation table, which was found for the GUI operation by a third machine that has synchronized the GUI operation, have been stored, wherein the translation table stores all texts that can become the GUI object content in the first language and their translations in the second language in association with each other as entries, and each of the entries has a unique Translation Table ID;

finding, in the match table, the Translation Table ID corresponding to the Operation ID of the GUI operation;

extracting, from the entry of the translation table indicated by the Translation Table ID, a translation in the second language of the GUI object content; and replacing the GUI object content in the object information in the first language with the translation, so that the object information in the first language is converted to the object information in the second language.

17. The system of claim 16, wherein the processor further is programmed to initiate executable operations comprising:

if no GUI object is identified according to the object information in the second language, finding, in the translation table, a next entry including the GUI object content, other than the entry of the translation table indicated by the Translation Table ID, and extracting, from the next entry, a translation in the second language of the GUI object content;

replacing the GUI object content in the object information in the first language with the translation, so that the object information in the first language is converted to the object information in the second language again; and identifying a GUI object in the GUI displayed on the second machine according to the newly converted object information in the second language.

18. The system of claim 17, wherein if a corresponding GUI object is identified according to the newly converted object information in the second language, the Translation Table ID stored in association with the Operation ID in the match table is replaced with a Translation Table ID of the next entry, so as to update the match table.

19. A computer program product, comprising:

a computer readable storage device having program code stored thereon, the program code executable by a processor to perform:

receiving, using the processor, operation information of a Graphical User Interface (GUI) operation performed on a first machine, the operation information including object information and action information, the object information being in a first language and indicating a GUI object to which the GUI operation is directed, and the action information indicating an action performed by the GUI operation on the GUI object;

converting, using the processor, the object information in the first language to object information in a second language;

identifying, using the processor, a GUI object in a GUI displayed on a second machine according to the object information in the second language; and performing the action indicated by the action information on the identified GUI object using the processor, wherein the computer readable storage device does not consist of a transitory, propagating signal.

20. The computer program product of claim 19, wherein the object information includes a GUI object type and GUI object content.

* * * * *